June 28, 1966  YOSHIHISA MAITANI  3,257,923
SHUTTER DEVICE FOR SINGLE-LENS REFLEX CAMERA
Filed Feb. 17, 1964
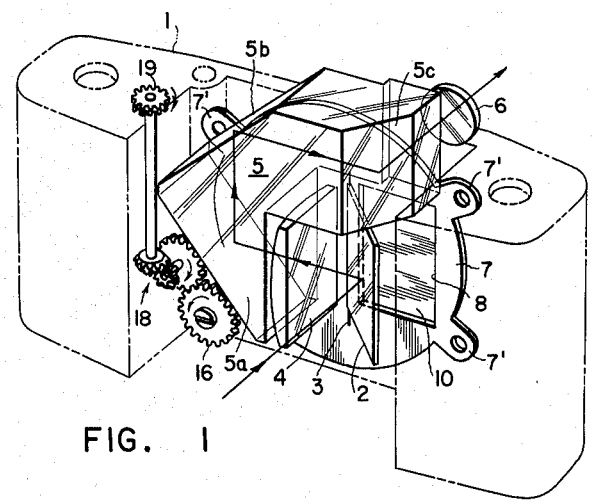
FIG. 1
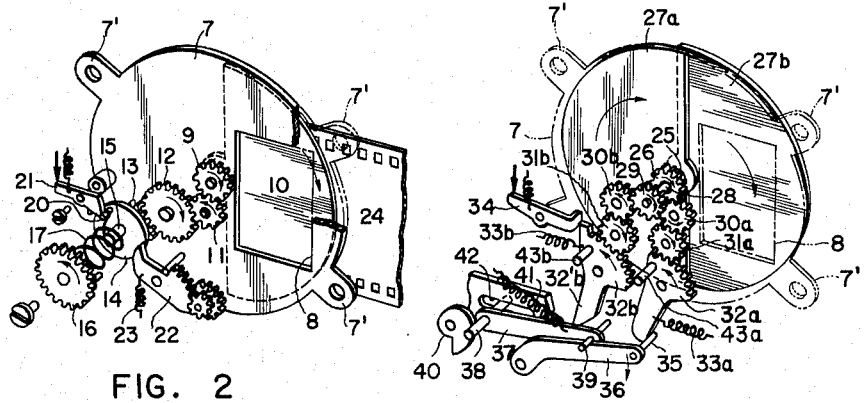
FIG. 2
FIG. 3
Yoshihisa Maitani
Inventor
By Wenderoth, Lind & Ponack
Attorneys

United States Patent Office 3,257,923
Patented June 28, 1966

3,257,923
SHUTTER DEVICE FOR SINGLE-LENS
REFLEX CAMERA
Yoshihisa Maitani, Tokyo, Japan, assignor to Olympus
Kogaku Kogyo Kabushiki-Kaisha, Tokyo, Japan
Filed Feb. 17, 1964, Ser. No. 345,394
Claims priority, application Japan, Feb. 19, 1963,
38/8,340
1 Claim. (Cl. 95—42)

This invention relates to a shutter device for use in a single-lens reflex camera and is especially suitable for use in such a camera including a film window relatively small in transverse dimension, for example, a photographic camera for recording on a 35 mm. wide perforated photographic film pictures corresponding in size to one standard picture frame presently used in the field of motion picture art.

An object of the invention is to proivde an improved shutter device for use in a single-lens reflex camera including a film window having a dimension in a film feeding direction not greater than that measured widthwise of a photographic film.

The invention is characterized by at least one shutter sector disposed on a base plate including a film window positioned adjacent a front surface of a photosensitive member, a shaft of rotation of said or each shutter sector, disopsed as near to the longitudinal side edge of the film window as possible, a drive disposed in a space between an optical system forming finder means and a housing for the photographic camera to drive said or each shutter sector, and gearing means for connecting said drive to said shaft.

The invention will become more readily apparent from the following detailed description taken in conjunction with the accompanying drawing in which:

FIG. 1 shows a fragmental perspective view of a single-lens reflex camera embodying the teachings of the invention and illustrates the manner in which the present shutter device is incorporated into a housing for the camera;

FIG. 2 shows an exploded perspective view of the shutter device illustrated in FIG. 1; and FIG. 3 shows an exploded perspective view of a modification of the invention.

To aid in understanding the invention I shall briefly describe an optical system forming finder means suitable for use with the same, in conjunction with FIG. 1 of the drawing.

In FIG. 1 a transversely elongated housing 1 for a single-lens reflex camera is centrally provided on the front side as viewed in FIG. 1 with a relatively wide U-shaped recess in which a movable reflecting mirror 2 is disposed on and at an angle to an optical axis of a photographic objective (not shown). The reflecting mirror 2 is normally maintained in its position illustrated in FIG. 1 and upon exposure, adapted to be rotated about a vertical axis 3 of rotation in the leftward direction as viewed in FIG. 1 to swing out of the optical axis of the objective. An object to be photographed may be focussed upon a focussing plate 4. An image formed on the focussing plate 4 is introduced through a prism or an optical reflecting system 5 to an eyepiece 6 disposed on the upper side of the housing 1. The prism 5 disposed in the recess on the housing 1 and includes a first reflecting plane 5a for reflecting the image on the focussing plate 4 in the upward direction, a second reflecting plane 5b for reflecting the ray of light reflected from the first reflecting plane 5a in the substantially horizontal direction, and a third reflecting plane 5c for directing the ray of light reflected from the second reflecting plane 5b in parallel relationship with the optical axis of the objective.

A circular base plate 7 is disposed in the recess on the housing 1 between the prism 5 and the housing 1 with a suitable spacing formed between the same and the bottom of the recess and is rigidly secured to the housing through a plurality of ears 7' radially projecting from its periphery. As shown in FIG. 2 the base plate 7 is provided with a rectangular film window 8 somewhat offset from its center toward the right as viewed in FIG. 2. The film window 8 is relatively elongated in the longitudinal direction. A shaft for a gear 9 made of a relatively thin material extends rotatably through the base plate 7 at its center and includes one end projecting beyond the rear surface of the base plate 7. Rigidly secured at that one end of the shaft for a gear 9 is a shutter sector 10 at its center of rotation.

The gear 9 is operatively coupled to a driving gear 13 through intermediate gears 11 and 12 disposed on the front side of the base plate 7. The driving gear 13 is rigid with a disk 14 through a common tubular shaft which, in turn, is rotatably carried on a stationary shaft 15 extending from the base plate 7 into a space positioned in the rear of the first reflecting plane 5a of the prism 5 and defined by the first reflecting plane 5a and a wall of the recess on the housing 1. A gear 16 for tensioning a shutter device is loosely mounted on the stationary shaft 15 at its extremity with a driving spring 17 interposed between the gear 16 and the disk 14 by having both ends secured to the gear 16 and the disk 14 respectively. As shown in FIG. 1, the tensioning gear 16 is operatively coupled through any suitable intermediate gearing 18 to a gear 19 disposed on the upper side of the housing 1 and adapted to be driven by a mechanism for taking up a photographic film (not shown).

Planted on the front surface of the disk 14 is a pin 20 on which one end of the driving spring 17 is anchored and against which a releasing lever 21 for releasing the shutter device abuts. The lever 21 is pivotably mounted on the base plate 7 at a suitable position and operatively coupled to a mechanism for releasing the shutter device (not shown). The releasing lever 21 is normally maintained in its position illustrated in FIG. 2.

As shown in FIG. 2, a toothed sector 22 forming part of a mechanism for delaying an exposure includes a trailing end portion positioned within a region of a path along which the pin 20 can be moved and tends to rotate in the counterclockwise direction as viewed in FIG. 2 by the action of any suitable spring 23.

As shown in FIG. 1, the prism 5 divides the recess on the housing 1 into a plurality of spaces. These spaces may be utilized to house the various gears as above described. That is to say, a triangularly prismatic space defined by the first reflecting plane 5a and the wall of the recess can be utilized to accommodate the principal components of a shutter driving mechanism comprising the disk 14, a driving spring 17, the tensioning gear 16 etc. and occupying a relatively large volume whereas a narrow space defined by the prism and the base plate 7 can be utilized to accommodate the intermediate gears 11 and 12, and the tensioning gear 9 integral with the shutter shaft. The reference number 24 designates a section of a photographic film adapted to be fed in the transverse direction or lengthwise of the same.

The arrangement thus far described is operated as follows:

When one frame of the photographic film 24 is transported the tensioning gear 19 is rotated in the direction of the arrow illustrated in FIG. 1 through the intermediate gearing 18 to thereby bring the driving spring 17 into its tensioned state. At that time, the disk 14 on which one end of the driving spring 17 is anchored is prevented from rotating through its engagement with the releasing lever 21 and hence the various movable components are maintained in their state illustrated in FIG. 2. It is assumed that, each time one frame of the film 24 has been transported the tensioning wheel 16 is rotated through a predetermined angle such as 360 degrees. If desired, tensioning wheel 16 may be rotated through any suitable angle different from 360 degrees for design purposes.

When a shutter releasing button (not shown) is operated after the completion of focussing operation, the reflecting mirror 2 is first moved out of the optical axis of the photographic objective and then the releasing lever 21 is pushed in the direction of the arrow illustrated in FIG. 2 permitting the end thereof to disengage from the pin 20 on the disk 14. Therefore, the gear 13 rigid with the disk 14 will be rotated in the direction of the arrow illustrated in FIG. 2 by the action of the resilience of the tensioned driving spring 17 to rotate the shutter section 10 integral with the gear 9 in the direction of the arrow illustrated in the same figure through the intermediate gears 12 and 11. After the pin 20 has been rotated through an angle of substantially 180 degrees or at the instant the shutter sector 10 has been rotated through the same angle as the pin 20 to fully open the film window 8, a desired low speed exposure is effected. If desired, the toothed sector 22 may engage the disk 14 to delay the exposure for a period of time predetermined by an operator. For each operation of the releasing button the shutter sector 10 is arranged to be stopped after just one complete rotation by any suitable mechanism (not shown) whereupon one exposure is completed.

Referring now to FIG. 3, there is illustrated a modification of the invention wherein, instead of a single shutter sector, a pair of shutter sectors are disposed on a base plate one of which serves as a preceding shutter sector and the other of which serves as a following shutter sector. The arrangement illustrated comprises a circular base plate 7 similar to that previously described in conjunction with FIGS. 1 and 2. As in the previous example, a shaft 25 extends rotatably through the base plate 7 at its center and includes both ends at which the center of a gear 26 and the center of rotation of a following shutter sector 27a are rigidly secured respectively such that the base plate is sandwiched between the gear and the sector with a small spacing left between each pair of opposed surfaces. The shaft 25 is of tubular type and has another shaft 28 rotatably fitted into the hollow portion thereof with both ends of the latter shaft projecting beyond the adjacent ends of the former shaft respectively. Rigidly secured on the shaft 28 at both ends are the center of a gear 29 and the center of rotation of a preceding shutter 27b respectively.

The gear 26 integral with the following shutter sector 27a is operatively coupled to a driving toothed sector 32a through intermediate gears 30a and 31a while the gear 29 integral with the preceding shutter sector 27b operatively coupled to another driving toothed sector 32b through intermediate gears 30b and 31b, all the intermediate gears being rotatably mounted on the base plate. The toothed sectors 32a and 32b are rotatably mounted on the base plate 7 at suitable positions and tend to rotate in the counterclockwise direction as viewed in FIG. 3 by the action of the associated springs 33a and 33b for driving the shutter sectors. One of the toothed sectors 32b associated with the proceding shutter sector 27b normally presses on one side against a shutter releasing lever 34 on the folded end portion, the lever being pivotably mounted on the base plate 7. The other toothed sector 32a associated with the following shutter sector 27a includes a trailing end portion normally pressing against pin 35 planted an arm 36 at one end under the influence of the driving spring 33a. The arm 36 is pivotally mounted at the other end to a stationary part on a housing (not shown).

A floating arm 37 slightly overlaps the arm 36 in the rear of the same and includes a pair of pins 38 and 39 secured thereto at both ends each projecting shortly from both side of the floating arm. One end portion of the pin 39 extends slightly beyond the arm 36 to contact the upper edge of the same while the opposite end portion of the pin 39 extends to reach a path along which the trailing end portion 32'b of the toothed sector 32b moves. Similarly that end portion of the pin 39 extending in the same sense as the portion of the pin 38 contacting the arm 36 is pressed against an operating surface of a cam 40 for controlling a shutter speed under the influence of a spring 41 while the opposite end portion of the pin 39 is slidably fited into a guiding groove 42 substantially horizontally formed on a stationary part on the housing (not shown). With this arrangement, rotational movement of the control cam 40 causes the floating arm 37 to horizontally move along the guiding groove 42.

As in the previous example, the principal parts of a mechanism for driving the shutter can be accommodated in a space defined by a first reflecting plane of a finder prism and a wall of the camera housing while the trains of gears 26, 30a and 31a and 29, 30b and 31b can be disposed in a narrow space formed between the finder prism and the base plate 7.

The arrangement illustrated in FIG. 3 is operated as follows: When one end of the releasing lever 34 operatively coupled to a shutter releasing button (not shown) is pushed in the direction of the arrow illustrated in FIG. 3, the lever disengages at the other end from the shoulder on the preceding toothed sector 32b to thereby rotate the toothed sector in the direction of the arrow illustrated in FIG. 3 by the action of the driving spring 33b. This permits the preceding shutter sector 27b to rotate in the direction of the arrow illustrated in FIG. 3 through the gear trains 29, 30b and 31b to open a film window designated at dotted-and-dashed line 8.

Subsequently a bevelled edge formed on the righthand side of the trailing end portion 32'b of the toothed gear 32b abuts against the pin 39 to depress the same about the other pin 38. This cause the arm 35 to rotate about its pivot in the direction of the arrow illustrated in FIG. 3 to disengage the pin 35 from the trailing end portion of the following toothed sector 32a to thereby rotate the toothed sector in the direction of the arrow illustrated in FIG. 3 by the action of the driving spring 33a. Therefore, the following shutter sector 27a is rotated in the direction of the arrow illustrated in FIG. 3 through the gear trains 26, 30a and 31a to again close the film window 8 previously opened by the preceding shutter sector 27b whereupon an exposure operation is completed. Each of the shutter sectors 27b and 27a is constructed and arranged to be rotated through an angle of substantially 180 degrees for each operation of the shutter releasing button.

In order to tension the shutter device, tensioning element (not shown) can be operated to simultaneously move pin 43a and 43b planted respectively on the toothed sectors 32a and 32b against the action of the springs 33a and 33b whereby the preceding toothed sector 32b engages the releasing lever 34 while the following toothed sector 32a engages the pin 35 on the arm 36. During this tensioning movement each shutter sector is rotated in the direction reverse from that in the exposuring movement to return back to its original position illustrated in FIG. 3.

If the exposure time is desired to be controlled then the control cam 40 can be externally rotated to displace the floating arm 37 in the horibontal direction to thereby vary a spacing between the pin 39 on the floating arm 37 and the trailing end portion 32'b of the preceding toothed sector 32b. For example, if the pin 39 is closely near to the trailing end portion 32b, then a period of time will become very short before the trailing end portion abuts against the pin 39 with the result that immediately after the preceding shutter sector has been rotated the following shutter sector is rotated. On the contrary, if the trailing end portion 32'b is relatively far spaced away from the pin 39 the result reverse from that above described will be obtained.

What I claim is:

In a signle-lens reflex camera, an elongated housing adapted to have a length of photographic film moved within the housing along the length thereof, the housing having a film window through which the film is exposed, said window having a dimension in the direction of the length of the film not greater than the width dimension of the film, said housing having a recess therein, a view finder means in said recess and including a first reflecting mirror disposed on and at an angle to the optical axis of a photographic objective to reflect an image for an object to be photographed, a focusing plate longitudinally disposed within the recess in the housing and having a surface on which the image is reflected from the first reflecting mirror, three reflecting surfaces in said recess, two of which surfaces are disposed substantially orthogonally to each other in said recess and define a space beneath the lower of said two surfaces, said surfaces being positioned in said recess for receiving the image from said focusing plate, a shaft for rotation of a shutter sector disposed adjacent the middle point on one of the longitudinal side edges of the film window, a shutter sector on said shaft, and a drive for the shutter sector coupled to the shutter sector and disposed in the space beneath the lower of said two reflecting surfaces and in front of the plane of the part of the housing having the film window therein.

References Cited by the Examiner

UNITED STATES PATENTS

| | | | |
|---|---|---|---|
| 1,218,342 | 3/1917 | Vinik | 352—206 |
| 1,275,249 | 8/1918 | Hlavaty | 95—42 X |
| 1,348,778 | 8/1920 | Boyce | 95—61 |
| 1,984,103 | 12/1934 | Wittel | 352—206 |

JOHN M. HORAN, *Primary Examiner.*